Oct. 14, 1941.   D. D. DEMAREST ET AL   2,258,644
THREAD GRIPPING AND GUIDING DEVICE
Filed Aug. 1, 1940
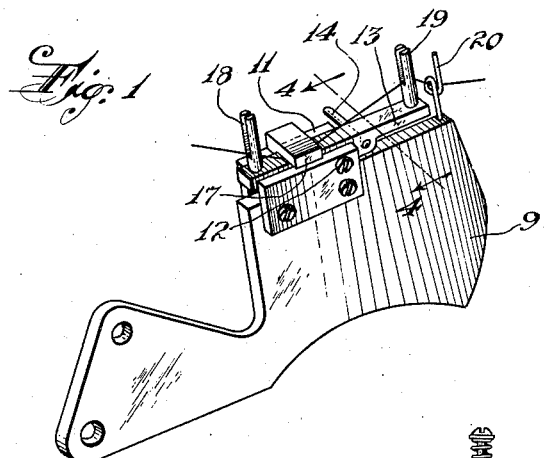
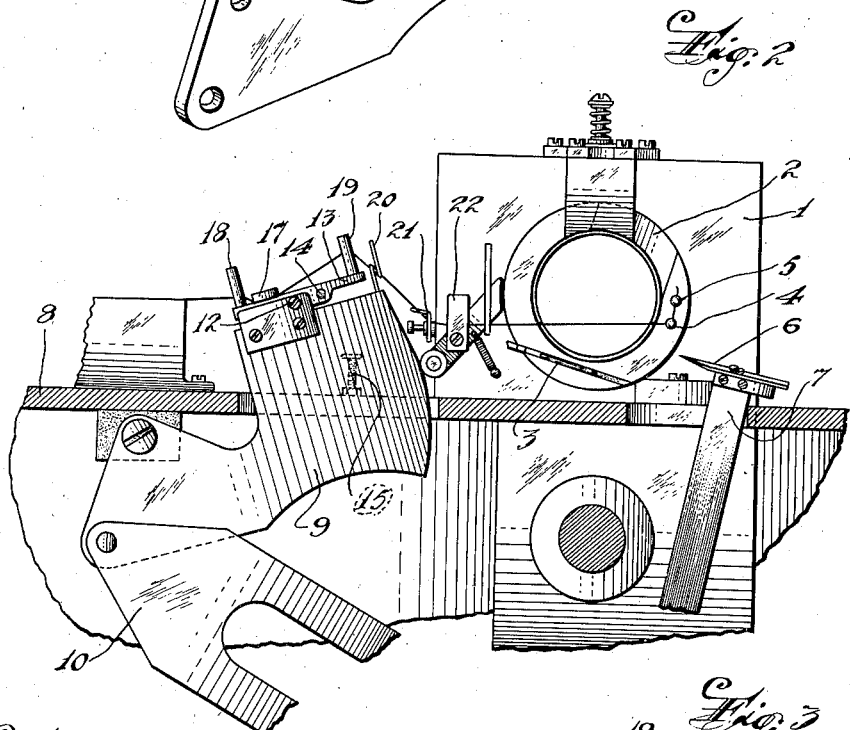
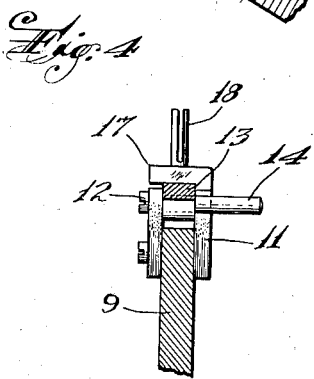
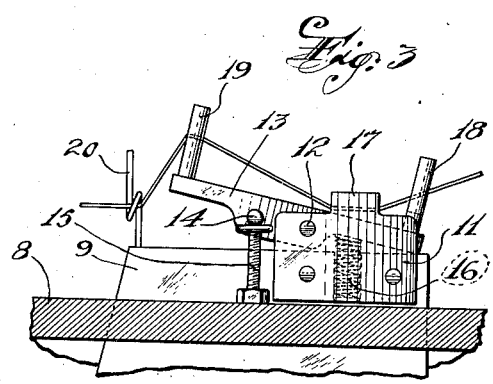
INVENTORS
DANIEL DOUGLAS DEMAREST
BY CARL BERENDT
WILLIAM KARIUS
Fredk C. Fischer Atty.

Patented Oct. 14, 1941

2,258,644

UNITED STATES PATENT OFFICE 2,258,644

THREAD GRIPPING AND GUIDING DEVICE

Daniel Douglas Demarest, Little Neck, N. Y., and Carl Berendt, East Orange, and William Karius, Irvington, N. J., assignors to Automatic Linker, Inc., Newark, N. J., a corporation of New York Application August 1, 1940, Serial No. 349,215

7 Claims. (Cl. 17—34)

This invention relates to automatic sausage linking machines and more particularly to improvements in devices for automatically winding the thread about a sausage casing to form links of sausages.

In automatic sausage linking devices such as disclosed in U. S. Patent #2,228,075, dated January 7, 1941, sausage links are formed and defined by automatically wrapping or winding a thread about a casing containing sausage. During this winding operation, it is necessary that at certain periods the thread be held tightly so that the thread can be wound tightly about the sausage casing. Inasmuch as these machines are rapid in operation, forming in the neighborhood of 200 or more links per minute, it is essential that the control of the thread be positive and reliable, and consequently, it is desirable that the device for gripping and guiding the thread be of simple structure.

It is, therefore, an object of this invention to provide in an automatic sausage linking machine, a device for guiding and gripping a winding thread, which device is of simple structure, having few parts, reliable in operation, with little likelihood of getting out of order.

A further object is the provision in a sausage linking machine of a device for automatically gripping a winding thread at predetermined intervals to enable the thread to be intermittently issued in predetermined lengths for winding about a sausage casing.

These and other advantageous objects, which will later appear, are accomplished by the simple and practical construction and arrangement of parts hereinafter described and exhibited in the accompanying drawing, forming part hereof, and in which:

Fig. 1 is a perspective view of a thread gripping device embodying the invention, Fig. 2 is an elevational view of a section of a sausage linking machine having the device applied thereto, Fig. 3 is an elevational view showing details of the gripping device, and Fig. 4 is a sectional view taken on line 4—4 of Fig. 1.

Referring to the drawing, in Fig. 2 there is shown an elevational view of a portion of an automatic sausage linking machine having a block 1 which supports a winder head 2 through which the sausage casings pass. The winder head carries a thread catch 3, a gripper hook 4 and a knife hook 5. Positioned adjacent the winding head is a knife 6 mounted upon a knife arm 7 which periodically is moved inwardly to cause the knife to sever the thread. Pivotally mounted on the upper plate 8 of the machine is a pull back arm 9 which is raised and lowered periodically by a member 10 which is associated with cam means not shown.

Attached to the pull back arm 9 is a bracket 11 which pivotally supports at 12 a small beam 13 having projecting laterally therefrom a pin 14 which is adapted to engage projection 15 on the plate 8. The arm 9 has mounted thereon a compression spring 16 which bears against one end of the beam 13 and tends to constantly rotate the beam clockwise (see Fig. 2) to cause the beam to engage a flange 17 integral with bracket 11.

The winding thread passes through an upstanding slitted pin 18 mounted on the beam 13, down between flange 17 and the beam, and thence upward to another slitted pin 19 mounted at the other end of the beam. From pin 19 the thread passes down through a guide loop 20 through guides 21 and 22 to the gripper hook 4.

In operation, when the beam 13 and pull back arm 9 are in the position shown in Fig. 3, the pin 14 engages the projection 15 to raise one end of the beam 13 and to lower the other end of the beam against the action of the compression spring 16. This removes the beam from contact with the flange 17 and allows the thread to pass freely through the guide pins and other parts. At this time, the thread is gripped by a thread catch 3 and finally caused to engage the gripper hook 4 and knife hook 5.

The rotation of the winder head 2 draws a predetermined length of thread through the guide, and continued rotation of the winder head winds this thread about a sausage casing passing therethrough. In order to constrict the sausage casing and tightly wind the sausage casing into links, the thread must be held tight during the winding operation. This is accomplished by the member 10 raising the pull back arm 9 to disengage the pin 14 from the projection 15, which allows the compression spring 16 to force the beam 13 against the flange 17 and tightly grip the thread between the two. The thread holder and thread will then be in a position as shown in Fig. 2 in which the winder head causes a downward pull on the thread through split guide pin 19 and loop 20. This downward pull increases the gripping action between flange 17 and beam 13 and holds the thread tightly during the winding of the thread about the sausage casing. It will be seen that the downward pull is essential, as an upward pull on the thread through split guide pin 19 will allow the thread to pass freely between flange 17 and beam 13.

From the above description it will be seen that there has been provided a simple and effective thread gripping and guiding device for use on automatic sausage linking machines. The device is constructed and arranged so that the greater the pull upon the thread, the tighter it will be gripped. This insures a positive tight winding and constricting of the sausage casing to form links of sausages. After the sausage casing has been properly wound with the thread to form the desired links, the pull back arm 9 is quickly lowered to cause pin 14 to engage projection 15 and move the beam against the action of the spring 16 to allow the thread to pass freely therethrough.

The foregoing disclosure is to be regarded as descriptive and illustrative only, and not as restrictive or limitative of the invention, of which, obviously, embodiments may be constructed, including many modifications, without departing from the spirit and scope of the invention herein set forth and denoted in the appended claims.

Having thus described the invention, what is claimed as new and desired to be secured by Letters Patent, is:

1. In an automatic sausage linking machine, a thread gripping and guiding device comprising a pull back arm, means to periodically raise and lower said arm, a bracket fixed to the upper end of the arm, a beam pivoted to said bracket and having slitted pins at each end thereof, a pin projecting laterally from said beam, said bracket having a flange overlying said beam, and a compression spring supported by said arm and bearing against one end of the beam to force the beam into engagement with said flange.

2. In an automatic sausage linking machine, a thread gripping and guiding device comprising a pull back arm, means to periodically raise and lower said arm, a bracket fixed to the upper end of the arm, a beam pivoted to said bracket and having slitted pins at each end thereof, a pin projecting laterally from said beam, said bracket having a flange overlying said beam, and a compression spring supported by said arm and bearing against one end of the beam to force the beam into engagement with said flange, said machine having a projection adapted to engage the laterally projecting pin to move the beam from engagement with said flange against the action of said spring.

3. In an automatic sausage linking machine, a thread gripping and guiding device comprising a pull back arm, means to periodically raise and lower said arm, a bracket fixed to the upper end of said arm, a beam pivoted to said bracket and having upstanding guide means at each end thereof, said bracket having a flange overlying said beam, and a compression spring supported by said arm and bearing against one end of the beam to force the beam into engagement with said flange.

4. In an automatic sausage linking machine, a thread gripping and guiding device comprising a pull back arm, means to periodically raise and lower said arm, a bracket fixed to the upper end of said arm, a beam pivoted to said bracket and having upstanding guide means at each end thereof, said bracket having a flange overlying said beam, a compression spring supported by said arm and bearing against one end of the beam to force the beam into engagement with said flange, and means to periodically engage the beam to move the beam from engagement with said flange.

5. In an automatic sausage linking machine, a thread gripping and guiding device, comprising an arm adapted to be periodically raised and lowered, a beam pivotally mounted on said arm, upstanding guide members mounted on each end of said beam, a member attached to said arm and overlying said beam under which thread is adapted to be passed, resilient means normally urging said beam into engagement with said overlying member, and means engageable with said beam at predetermined intervals to move the beam from engagement with said overlying member.

6. In an automatic sausage linking machine, a thread gripping and guiding device, comprising an arm adapted to be periodically raised and lowered, a beam pivotally mounted on said arm, upstanding guide members mounted on each end of said beam, a member attached to said arm and overlying said beam under which thread is adapted to be passed, resilient means normally urging said beam into engagement with said overlying member, means engageable with said beam at predetermined intervals to move the beam from engagement with said overlying member, and a guide loop mounted on said arm adjacent the end of the beam remote from said overlying member, said guide loop being arranged below the adjacent guide member of the beam so that thread passing over said guide member to the guide loop will be directed downwardly.

7. In an automatic sausage linking machine, a thread gripping and guiding device comprising an arm adapted to be periodically raised and lowered, a beam pivotally mounted on said arm, upstanding guide pins mounted on each end of said beam, a member attached to said arm and overlying said beam, the thread being passed under said overlying member and directed upwardly over said guide pins at the ends of the beam, resilient means normally urging said beam into engagement with said overlying member, and a guide loop mounted on said arm, the thread being directed downwardly from the adjacent guide pin to said guide loop.

DANIEL DOUGLAS DEMAREST.
CARL BERENDT.
WILLIAM KARIUS.